(12) United States Patent
Yamamoto et al.

(10) Patent No.: US 12,103,550 B2
(45) Date of Patent: Oct. 1, 2024

(54) SECOND TASK EXECUTION ASSISTANCE DEVICE AND NON-TRANSITORY COMPUTER READABLE STORAGE MEDIUM

(71) Applicant: DENSO CORPORATION, Kariya (JP)

(72) Inventors: Takeshi Yamamoto, Kariya (JP); Asako Nagata, Kariya (JP); Yuji Ota, Kariya (JP); Shizuka Yokoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 17/583,659

(22) Filed: Jan. 25, 2022

(65) Prior Publication Data

US 2022/0144301 A1    May 12, 2022

Related U.S. Application Data

(63) Continuation of application No. PCT/JP2020/022629, filed on Jun. 9, 2020.

(30) Foreign Application Priority Data

Jul. 29, 2019    (JP) .................................. 2019-139116

(51) Int. Cl.
    *B60W 50/14*    (2020.01)
    *B60W 60/00*    (2020.01)

(52) U.S. Cl.
    CPC ........ *B60W 50/14* (2013.01); *B60W 60/0013* (2020.02); *B60W 2554/40* (2020.02); *B60W 2555/20* (2020.02)

(58) Field of Classification Search
    CPC ............ B60W 50/14; B60W 60/0013; B60W 2554/40; B60W 2555/20; G01C 21/3697; G01C 21/34; G09B 29/10
    See application file for complete search history.

(56) References Cited

U.S. PATENT DOCUMENTS

| | | | |
|---|---|---|---|
| 2016/0298976 A1 | 10/2016 | Sato et al. | |
| 2016/0305787 A1* | 10/2016 | Sato .................. | G08G 1/096844 |
| 2017/0010613 A1 | 1/2017 | Fukumoto | |
| 2018/0299281 A1 | 10/2018 | Takashima | |
| 2018/0357233 A1* | 12/2018 | Dazé ....................... | H04L 12/40 |
| 2020/0073954 A1* | 3/2020 | DeLuca .............. | G06F 16/4393 |
| 2020/0309547 A1* | 10/2020 | Davidsson ......... | G01C 21/3415 |

FOREIGN PATENT DOCUMENTS

| | | |
|---|---|---|
| JP | 2007-078587 A | 3/2007 |
| JP | 2007-120990 A | 5/2007 |
| JP | 2012-127733 A | 7/2012 |

(Continued)

*Primary Examiner* — Anshul Sood
*Assistant Examiner* — Micah Chuen-Him Cheng
(74) *Attorney, Agent, or Firm* — Harness, Dickey & Pierce, P.L.C.

(57) ABSTRACT

An execution of a second task of a driver is assisted in cooperation with a user interface in an autonomous driving state in which a vehicle is an execution entity of a driving task. The second task is extracted, which is properly executable within task possible time estimated as time in which the second task is executable in a route to a destination of the vehicle. The second task extracted by the second task extracting unit is suggested through the user interface.

12 Claims, 10 Drawing Sheets

(56) References Cited

FOREIGN PATENT DOCUMENTS

| | | |
|---|---|---|
| JP | 2015-141050 A | 8/2015 |
| JP | 2015-141051 A | 8/2015 |
| JP | 2015-141052 A | 8/2015 |
| JP | 2015-141054 A | 8/2015 |
| JP | 2015-141477 A | 8/2015 |
| JP | 2015-141560 A | 8/2015 |
| JP | 2015-158467 A | 9/2015 |
| JP | 2015-184110 A | 10/2015 |
| JP | 2017-078605 A | 4/2017 |
| JP | 2017215721 A | 12/2017 |
| JP | 2018-040574 A | 3/2018 |

\* cited by examiner

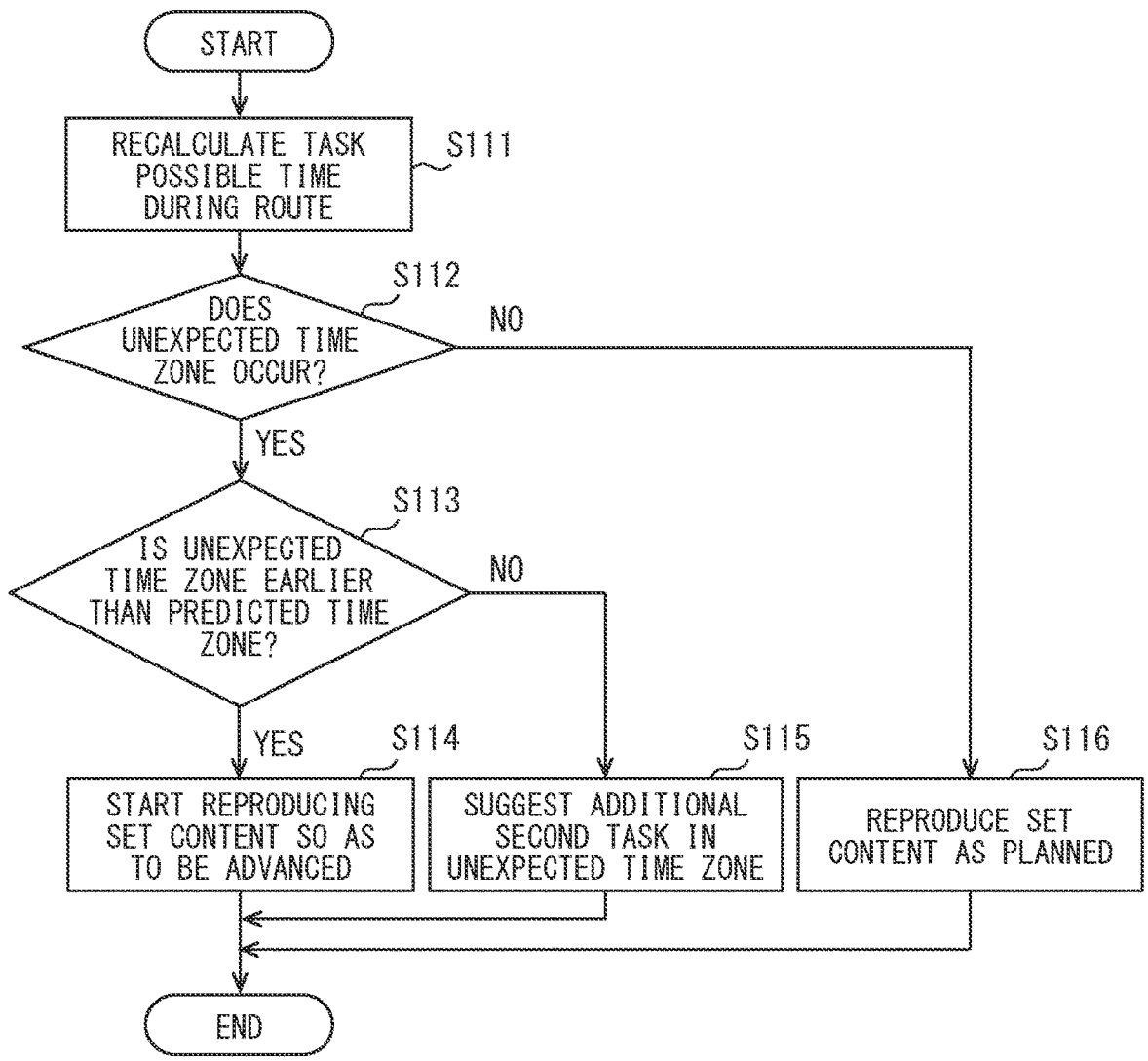

SECOND TASK EXECUTION ASSISTANCE DEVICE AND NON-TRANSITORY COMPUTER READABLE STORAGE MEDIUM

CROSS REFERENCE TO RELATED APPLICATIONS

The present application is a continuation application of International Patent Application No. PCT/JP2020/022629 filed on Jun. 9, 2020, which designated the U.S. and claims the benefit of priority from Japanese Patent Application No. 2019-139116 filed on Jul. 29, 2019. The entire disclosures of all of the above applications are incorporated herein by reference.

TECHNICAL FIELD

The present disclosure relates to a second task execution assistance device and a non-transitory tangible computer readable storage medium.

BACKGROUND

A conceivable technique teaches a path search device for retrieving a path reaching a destination by the time content based on a watch request is watched until the end.

SUMMARY

According to an example, an execution of a second task of a driver is assisted in cooperation with a user interface in an autonomous driving state in which a vehicle is an execution entity of a driving task. The second task is extracted, which is properly executable within task possible time estimated as time in which the second task is executable in a route to a destination of the vehicle. The second task extracted by the second task extracting unit is suggested through the user interface.

BRIEF DESCRIPTION OF THE DRAWINGS

The above and other objects, features and advantages of the present disclosure will become more apparent from the following detailed description made with reference to the accompanying drawings. In the drawings:

FIG. 7 is a flowchart illustrating processes by the HCU of the first embodiment;

FIG. 8 is a diagram illustrating a route plan and a second task suggestion screen in a second embodiment;

DETAILED DESCRIPTION

Figure 1:
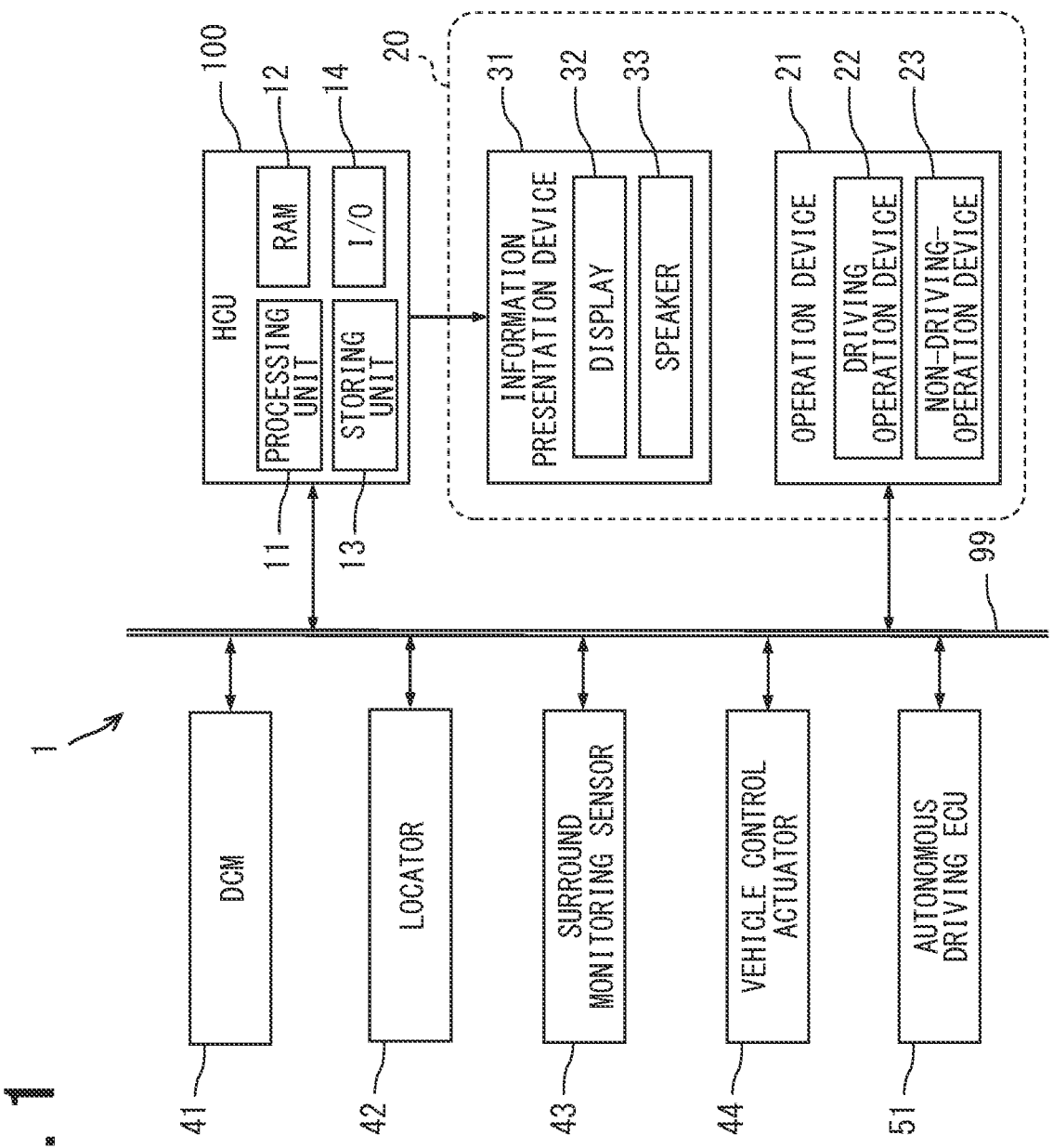
FIG. 1 is a diagram illustrating an entire image of an in-vehicle network including an HCU of a first embodiment.

In recent years, a vehicle having an autonomous driving function in which the vehicle becomes an execution entity of a driving task is being rapidly spread. In such a vehicle, there is a case that execution of a second task by the driver in an autonomous driving state is permitted. In the device of the conceivable technique, however, since content based on a watch request is continuously reproduced until the end in a route to a destination, in some cases, it is unpreferable for the driver to enjoy it as a second task.

In the autonomous driving state, by selecting and executing a proper second task, the driver can enjoy the second task more. However, since a driver cannot easily know a condition that a second task can be executed, it is difficult for the driver to select a proper second task by himself/herself. Therefore, it is demanded to assist so that a driver can select a proper second task and execute it.

A second task execution assistance device and a non-transitory tangible computer readable storage medium for enabling a second task proper to a driver to be easily selected and executed.

One of modes disclosed here is a second task execution assistance device assisting execution of a second task of a driver in an autonomous driving state in which a vehicle is an execution entity of a driving task, in cooperation with a user interface, including:
a second task extracting unit extracting the second task which can be executed properly within task possible time predicted as time in which the second task can be executed in a route to a destination of the vehicle; and
a second task suggesting unit suggesting the second task extracted by the second task extracting unit through the user interface.

Another one of the disclosed modes is a second task execution assistance program assisting execution of a second task of a driver in an autonomous driving state in which a vehicle is an execution entity of a driving task, in cooperation with a user interface,
wherein at least one processing unit is made execute:
a process of extracting the second task which can be executed properly within task possible time predicted as time in which the second task can be executed in a route to a destination of the vehicle; and
a process of suggesting the extracted second task via the user interface.

According to those modes, a second task suggested to a driver through the user interface is a second task which can be executed properly within task possible time predicted as time in which a second task can be executed. Since a second task appropriate to task possible time is suggested, even when it is difficult for a driver himself/herself to accurately understand and predict a condition under which a second task can be executed and task possible time corresponding to the condition, the driver can easily select a proper second task. By selecting and executing a second task optimized in time, the driver can effectively use time in a route to a destination.

Hereinafter, a plurality of embodiments will be described with reference to the drawings. In some cases, by assigning the same reference numeral to corresponding components in each of the embodiments, repetitive description is omitted. In the case where only a part of a configuration is described in each of the embodiments, with respect to another part of the configuration, the configuration of another embodiment described antecedently can be applied. The present embodiments are not limited only to combinations of configurations demonstrated in description of the embodiments. When no hindrance occurs in a combination, even it is not demonstrated, the configurations of the plurality of embodiments can be partly combined.

First Embodiment

As illustrated in FIG. 1, a display control device according to a first embodiment of the present disclosure is an HCU (Human Machine Interface) 100. The HCU 100 forms an information presentation system in cooperation with an information presentation device 31 and the like. The HCU 100 is an electronic control device controlling the information presentation device 31 and realizing compositely an information presentation function, a second task execution assistance function, and the like. The HCU 100 is used in a vehicle 1 and, for example, is mounted in the vehicle 1. The HCU 100 is communicably connected to a communication bus 99 of an in-vehicle network mounted in the vehicle 1. The HCU 100 is one of a plurality of nodes provided for the in-vehicle network. To the communication bus 99 of the in-vehicle network, for example, an operation device 21, a DCM (Data Communication Module) 41, a locator 42, a surround monitoring sensor 43, a vehicle control actuator 44, and an autonomous driving electric control unit (ECU) 51 are connected as nodes.

The operation device 21 is an intension input unit receiving a user operation by an occupant such as a driver. The operation device 21 includes a driving operation device 22 such as a steering wheel, an accelerator pedal, a brake pedal, and the like for executing a driving operation. When a user operation is performed for the driving operation device 22, information of the user operation is provided to the autonomous driving ECU 51 and the like.

The operation device 21 includes a non-driving-operation device 23. The non-driving-operation device 23 performs switching of start and stop and setting change with respect to an autonomous driving function, a cooling/heating function, a function of setting a route to a destination, a second task execution assistance function, and the like. As the non-driving-operation device 23 for executing the user operations, for example, a steer switch provided for a spoke unit of a steering wheel, an operation lever provided for a steering column unit, a touch panel provided integrally with a display 32 of the information presentation device 31, a gesture operation device detecting a gesture as a user operation using a shooting module such as a driver status monitor, and the like can be mentioned. When a user operation is executed for the non-driving-operation device 23, information of the user operation is provided for the autonomous driving ECU 51, the HCU 100, and the like. The operation device 21 forms a user interface 20 of the vehicle 1 in cooperation with the information presentation device 31 and the like.

The DCM 41 is a communication module mounted in the vehicle 1. The DCM 41 transmits/receives electric waves to/from the vehicle 1 and a base station in the periphery by wireless communication conformed to the communication standard such as LTE (Long Term Evolution), 5G, or the like. By mounting the DCM 41, the vehicle 1 becomes a connected car which is connected to the Internet. The DCM 41 obtains various data from a probe server provided in the cloud. The various data includes latest map data of the road on which the vehicle 1 travels, data of traffic information (for example, present traffic amount, predicted traffic amount, and road situations such as traffic rule by a construction), data of weather information (for example, present weather and predicted weather), reproduction data of content to be reproduced in the information presentation device 31, and the like.

The locator 42 generates high-precision position information of the vehicle 1 by composite positioning of combining a plurality of pieces of acquisition information. The locator 42 can specify, for example, a lane in which the vehicle 1 travels in a plurality of lanes. The locator 42 includes a GNSS receiver receiving positioning signals transmitted from a plurality of artificial satellites, an inertial sensor, a map database in which the above-described map data is stored, and a locator ECU generating position information of the vehicle 1 by combining data obtained from those units.

The surround monitoring sensor 43 is an autonomous sensor monitoring the surrounding environment of the vehicle 1. The surround monitoring sensor 43 can detect, from the detection range of the periphery of the vehicle 1, a moving object such as a pedestrian, a cyclist, an animal other than a human, another vehicle, and the like, a stationary object such as a fallen object on the road, a guardrail, a curbstone, a road sign, a pavement mark such as a driving compartment line, and a construction by the roadside, and the like. The surround monitoring sensor 43 provides detection information obtained by detecting an object around the vehicle 1 to the autonomous driving ECU 51, the HCU 100, and the like via the communication bus 99.

The surround monitoring sensor 43 has a front camera and a millimeter-wave radar as detection components for detecting an object. The front camera outputs, as detection information, at least one of image data obtained by shooting the front range of the vehicle 1 and a result of analyzing the image data. A plurality of millimeter-wave radars are disposed, for example, in front and rear bumpers of the vehicle 1 at intervals. The millimeter-wave radar emits millimeter waves or quasi-millimeter waves to the front range, the front side range, the rear range, the rear side range, and the like of the vehicle 1. The millimeter-wave radar generates detection information by a process of receiving a reflection wave reflected by a moving object, a stationary object, or the like. A detection configuration of a lidar, a sonar, or the like may be included in the surround monitoring sensor 43.

The vehicle control actuator 44 has a configuration including a vehicle steering device, a vehicle driving device, and a vehicle braking device for executing a driving operation. The driving operation includes vehicle steering, vehicle driving, and vehicle braking. The vehicle steering device is a device of controlling a steering angle given to, for example, the front wheels of the vehicle 1. The vehicle driving device is a device of driving, for example, the front wheels of the vehicle 1 by using power provided from the power source of the vehicle 1. The vehicle braking device is a device of braking, for example, the front wheels of the vehicle 1 by a braking method such as friction braking, regenerative braking, or the like.

The autonomous driving ECU 51 is an electronic control unit realizing compositely an autonomous driving function, an advanced driver assist function, and the like. The autonomous driving ECU 51 forms a vehicle control system in cooperation with the HCU 100 and the like. The autonomous driving ECU 51 can recognize the peripheral environment of the vehicle 1 on the basis of detection information obtained from the surround monitoring sensor 43. The autonomous driving ECU 51 also can control the vehicle control actuator 44. By mounting the autonomous driving ECU 51, the vehicle 1 can perform at least a part of the driving task for the driver. The driving task includes driving operation and monitoring of the surroundings. With the configuration, the vehicle 1 of the embodiment can perform the automation driving of Level 3 in the automation driving levels defined by the society of automotive engineers of the United States.

Figure 2:
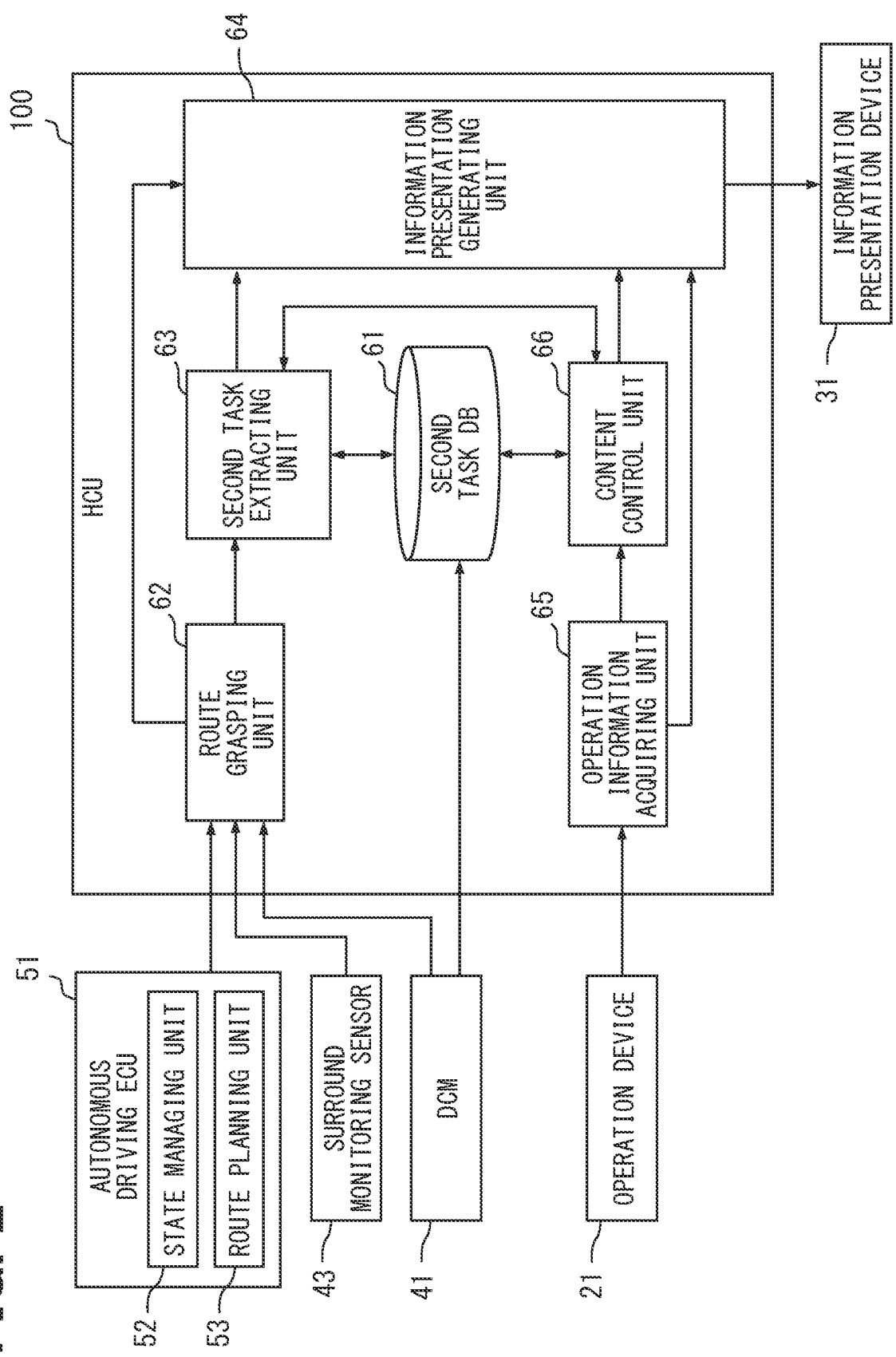
FIG. 2 is a diagram illustrating a schematic configuration of the HCU of the first embodiment.

The autonomous driving ECU 51 has a configuration including, mainly, a computer having a processor, a RAM (Random Access Memory), a storage unit, an input/output interface, a bus which connects those components, and the like. The autonomous driving ECU 51 has a plurality of function units realizing autonomous driving and advanced driver assist by executing a program stored in the storage unit by the processor. Concretely, as illustrated in FIG. 2, the autonomous driving ECU 51 has an autonomous driving state managing unit 52 and a route planning unit 53.

The autonomous driving state managing unit 52 manages the state of autonomous driving on the basis of position information of the vehicle 1 obtained from the locator 42, detection information obtained from the surround monitoring sensor 43, traffic information and weather information obtained through the DCM 41, further, setting information of the autonomous driving function by the non-driving-operation device 23, information of a user operation which is input to the driving operation device 22, and the like. Particularly, in the embodiment, the autonomous driving state managing unit 52 manages the automation driving level as a vehicle control state and properly switches. In the embodiment, the automation driving level takes a discrete numerical value as an integer which is equal to or larger than 0 and is equal to or less than three. It means that the higher the numerical value of the automation driving level becomes, the larger the range of the authority to execute a driving task of the autonomous driving ECU 51 (substantially the vehicle 1) becomes. The automation driving level switched by the autonomous driving state managing unit 52 is conformed to the automation driving level defined by the society of automotive engineers in the United States.

For example, in the case where the automation driving level is Level 0, the driver becomes an execution entity for all of the driving tasks. In the case where the automation driving level is Level 1, the execution entity of either vehicle steering or vehicle driving and vehicle braking in the driving tasks is the vehicle 1, and the execution entity of all of the other driving tasks becomes the driver. In the case where the automation driving level is Level 2, the execution entity of the driving operation of the vehicle steering, the vehicle driving, and the vehicle braking becomes the vehicle 1. The driver becomes the execution entity of the surrounding monitoring and monitors the execution state of the driving operation by the vehicle 1 and has to maintain a state where the driving operation device 22 can be immediately operated by, for example, gripping the steering wheel so that the driver can always intervene the driving operation.

In the case where the automation driving level is Level 3, the execution entity of all of the driving tasks of vehicle steering, vehicle driving, vehicle braking, and surrounding monitoring becomes the vehicle 1, and the autonomous driving ECU 51 on the vehicle 1 side executes those driving tasks. At this time, the driver can perform a second task without monitoring the execution state of the driving tasks by the autonomous driving ECU 51.

The second task is a secondary task indicating a task other than the driving in the case where the driving task is set as a primary task, and is also called a secondary task, a secondary activity, or other activities. The second task is a concept including various tasks such as watching of content, computer game, browsing and transmitting work of an e-mail, browsing of a website, operation of a cellular phone or smartphone, eating, making-up, and reading.

The autonomous driving state managing unit 52 properly switches the autonomous driving level. In the case where the automation driving level is Level 0, the autonomous driving ECU 51 obtains information of a user operation of the driving operation device 22 and controls the vehicle control actuator 44 so that the vehicle control actuator 44 operates with an operation amount and an operation timing faithful to the user operation. In the case where the automation driving level is Level 3, the autonomous driving ECU 51 calculates the operation of the vehicle control actuator 44 for making the vehicle 1 travel along a travel scheduled line planned by the route planning unit 53, and controls the vehicle control actuator 44 so as to realize the calculated operation. In the case where the automation driving level is Level 1 or 2, a control which is intermediate between the control at Level 0 and the control at Level 3 is executed.

When the vehicle 1 travels in an autonomous driving possible section in which the autonomous driving can be performed, the autonomous driving state managing unit 52 sets the upper limit of the automation driving level to Level 3 and sets the autonomous driving level according to various conditions. On the contrary, when the vehicle 1 travels in an automation driving impossible section and an automation driving restricted section in which the autonomous driving is restricted, the autonomous driving state managing unit 52 sets the upper limit of the automation driving level to Level 2 or lower.

The autonomous driving possible section and the autonomous driving restricted section are distinguished, in a case, by the road traffic law and ordinances of the country and the area in which the vehicle 1 travels and, in another case, distinguished on the basis of technical restrictions caused by the infrastructure construction state, the road shape, and the like of the road on which the vehicle 1 travels. For example, there is a case that an expressway corresponds to the autonomous driving possible section, and an ordinary road corresponds to the autonomous driving restricted section. The distinction of the autonomous driving possible section and the autonomous driving restricted section is, for example, associated with the above-described map data and stored as information in the map database in a storing medium.

Even when the vehicle 1 is travelling in the autonomous driving possible section, there is a case that the autonomous driving state managing unit 52 lowers the autonomous driving level to Level 2 or lower. For example, in the case where the autonomous driving function reaches a function limit or the reach to the function limit is predicted, the autonomous driving state managing unit 52 lowers the autonomous driving level to Level 2 or lower suddenly. As the reach to the function limit, occurrence of an event the autonomous driving ECU 51 does not expect in the surrounding environment, difficulty to continue operation of the autonomous driving function caused by a functional failure or the like of the surround monitoring sensor 43 due to bad weather, and the like can be mentioned. For example, the autonomous driving state managing unit 52 lowers the automation driving level to Level 2 or lower in accordance with an operation of changing the setting of the autonomous driving function by the driver.

In the embodiment, as an additional condition to set the automation driving level to Level 3 in the autonomous driving possible section, a condition that the speed of the vehicle 1 is less than a predetermined permissible speed (for example, 30 km/h) is given and, for example, a second task can be executed at the time of low-speed travel during traffic jams. On the contrary, in the case where the vehicle 1 is demanded to travel so that the speed of the vehicle 1 becomes equal to or higher than a predetermined permissible speed along the flow of traffic, the automation driving level is set normally to, for example, Level 2 also in the autonomous driving possible section. Further, there is a case that the automation driving level is suddenly lowered to Level 1 or lower as described above.

The route planning unit 53 plans a route of the vehicle 1 to the destination which is set by a user operation of the driver. The route planned by the route planning unit 53 includes a schematic route and a detailed route in a road on which the vehicle 1 is travelling at present. The schematic route is planned mainly before departure. The schematic route includes a path to the destination of the vehicle 1, departure time and prediction arrival time which is predicted, further, prediction driving time since the departure time to the prediction arrival time, prediction autonomous driving time which is predicted as time in which automation driving of Level 2 or higher can be performed, and the like. The prediction driving time can be schematically calculated on the basis of a way in the path obtained from the map data, information of speed limit of each of roads in the path, and traffic information and weather information. The prediction autonomous driving time can be calculated as prediction time required to pass the autonomous driving possible section in the driving time.

With respect to the schematic route, the route planning unit 53 schematically specifies roads on which the vehicle 1 travels to reach the destination as a path to the destination of the vehicle 1. One path or a plurality of paths may be specified. When the present time is before departure of the route, the route planning unit 53 calculates optimum departure time in consideration of traffic information and weather information for the specified path. The optimum departure time is not limited to one but, in many cases, a plurality of optimum departure times are calculated. The optimum departure time includes departure time for the earliest prediction arrival time, departure time which maximizes the ratio of the prediction autonomous driving time in prediction driving time since departure time to arrival time, departure time which minimizes the prediction driving time, departure time which optimizes the balance between the ratio of the prediction autonomous driving time and the length of the prediction driving time, departure time by which the time zone of the prediction autonomous driving time or the time zone of Level 3 is not easily divided into pieces, and the like.

For route plans corresponding to a plurality of optimum departure times on a one-by-one basis, the same path may be set or different paths may be set. The plurality of routes derived in such a manner are narrowed down to one route through intention confirmation using the HCU 100 which will be described specifically later and the user interface 20. Based on the one route plan which is narrowed down, the control of the vehicle control actuator 44, that is, execution of the driving task according to the automation driving level which is set by the autonomous driving state managing unit 52 is performed.

The detailed route includes a scheduled travel line of the vehicle 1, a speed plan of the vehicle 1, and the like. The detailed route is set for each road on which the vehicle 1 is travelling at present at the time of operation of the autonomous driving function and corrected according to the surrounding environment. The route planning unit 53 specifies, as a scheduled travel line, a lane on which the vehicle 1 travels among a plurality of lanes on the road on which the vehicle 1 is travelling at present, a trajectory of a lane change in the case where the vehicle 1 changes the lane, and the like. The scheduled travel line of the vehicle 1 is specified on the basis of detection information from the surround monitoring sensor 43, position information from the locator 42, and the like. With the specification of the scheduled travel line, the route planning unit 53 specifies a detailed speed plan such as acceleration and deceleration at the time of travelling on the scheduled travel line.

Next, the details of each of the information presentation device 31 and the HCU 100 included in the information presentation system will be described in order.

The information presentation device 31 is a device presenting information to the driver. As illustrated in FIG. 1, the information presentation device 31 has a configuration including the display 32 and a speaker 33. The display 32 is mounted, for example, in an instrument panel. The display 32 is a configuration having, as a main body, a display group including elements such as a graphic meter, a head up display (HUD), and a center information display (CID). The display 32 can display an image in a screen 32*a*.

The speaker 33 is disposed, for example, near the screen 32*a* of the display 32 in the instrument panel, a door panel, a rear quarter panel, and the like. The speaker 33 can make sound by converting an input electric signal to a physical signal by using a voice coil and a diaphragm. One or plural speakers 33 may be provided commonly to the whole display or may be provided so as to be paired with each of the elements constructing the display 32.

The HCU 100 is an electronic control unit integratedly controlling information presentation to an occupant such as a driver in cooperation with the autonomous driving ECU 51 and the user interface 20. The HCU 100 has a configuration including, as a main body, a computer having a processing unit 11, a RAM 12, a storing unit 13, an input/output interface 14, a bus connecting those components, and the like. The processing unit 11 is hardware for computing process coupled to the RAM 12. The processing unit 11 has a configuration including at least one computation core such as a CPU (Central Processing Unit) and a GPU (Graphic Processing Unit). The processing unit 11 may further include an IP core having an FPGA (Field-Programmable Gate Array) and another dedicated function, and the like. The RAM 12 may include a video RAM for generating a video image. By accessing the RAM 12, the processing unit 11 executes various processes for realizing functions of function units which will be described later. The storing unit 13 includes, for example, a non-volatile storing medium such as a semiconductor memory. In the storing unit 13, various programs (for example, a second task execution assistance program) to be executed by the processing unit 11, a second task database (hereinbelow, a second task DB) 61, and the like are stored.

The second task DB 61 illustrated in FIG. 2 is a database constructed by associating a list of various kinds of second tasks and task required time as time required for each of the second tasks. The list of second tasks includes a list of content to be watched. The content includes, for example, a movie, a TV program (including a recorded one), a moving picture distributed by the internet, and multi-media content such as an audio book. In the list of content, content recorded in the storing unit 13 and/or downloadable content by, for example, streaming, progressive download, batch download, or the like from an external server via the DCM 41 are written.

The list of second tasks may include not only the list of content but also a list of second tasks which can be executed by the driver such as a work of browsing and transmitting an e-mail, meals, and the like.

Preferably, the second task DB 61 is configured so that a second task in the list and information of the characteristic of the second task are also associated. As the characteristic of a second task, a variation characteristic of task required time, an interruption handling characteristic indicating that an interruption easily occurs or not, and the like can be mentioned. The characteristics of second tasks include a characteristic of content to be watched. The characteristics of content to be watched include a category of content such as action, horror, variety, and sports, performers of content, and the like.

The HCU 100 has a plurality of function units by executing a program stored in the storing unit 13 by the processing unit 11. Concretely, the HCU 100 has a route grasping unit 62, a second task extracting unit 63, an information presentation generating unit 64, an operation information acquiring unit 65, and a content control unit 66.

The route grasping unit 62 grasps the route to the destination of the vehicle 1. In the embodiment, since the route planning unit 53 of the autonomous driving ECU 51 generates a route plan, the route grasping unit 62 can grasp the route by obtaining information of the route plan generated by the autonomous driving ECU 51. Therefore, the route grasping unit 62 of the embodiment functions as a route information acquiring unit. The information of the route grasped by the route grasping unit 62 is provided to the second task extracting unit 63 and the information presentation generating unit 64.

The second task extracting unit 63 extracts a second task which can be properly executed within task possible time which is predicted as time in which a second task can be executed in the route plan grasped by the route grasping unit 62. The second task which can be executed properly means a second task which effectively uses most of the task possible time and can be finished within the task possible time. Most of the task possible time is, for example, 90% or more of the task possible time but may have a critical value such as 80% or more. The critical value is preliminarily set to, for example, a range equal to or more than 75% and less than 100%.

The second task extracting unit 63 has a time grasping function, a second task retrieving function, and an interruption risk grasping function. The time grasping function is a function of grasping task possible time. The second task extracting unit 63 grasps it by calculating the time in which the second task can be executed in the prediction autonomous driving time. In the embodiment, setting of Level 3 of the automation driving level at which a second task can be executed in the prediction autonomous driving time corresponding to Level 2 of the automation driving level is specified when the speed of the vehicle 1 is less than permissible speed. Therefore, the second task extracting unit 63 calculates, as task possible time, time expected that the vehicle 1 travels at speed less than the permissible speed in the prediction autonomous driving time predicted to be required to travel the autonomous driving possible section from the information of a schematic route plan made by the route planning unit 53.

Figure 3:
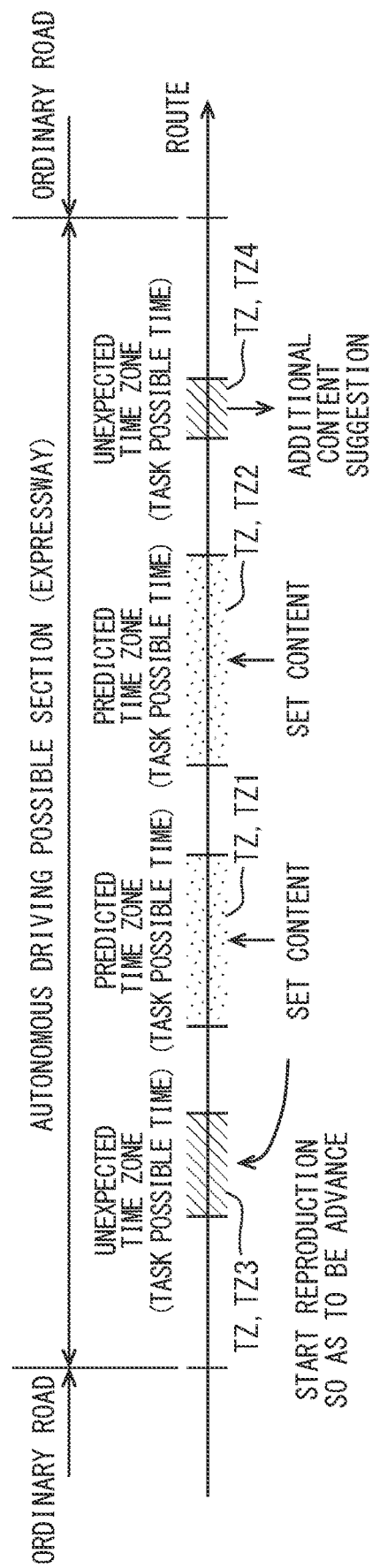
FIG. 3 is a diagram schematically illustrating task possible time and content in a route to a destination in the first embodiment.

The task possible time is predicted in consideration of at least one of the traffic information and the weather information. As illustrated in FIG. 3, there is the possibility that the task possible time becomes a time zone TZ in a lump in a route or is divided in a plurality of short time zones TZ1 and TZ2.

The second task extracting unit 63 properly recalculates time in which a second task can be executed in accordance with a change in the traffic state and a change in the weather state also during the route to the destination after departure of the vehicle 1. A result of recalculation is used for a process by the content control unit 66.

The second task retrieving function is a function of retrieving a second task. The second task extracting unit 63 accesses the second task DB 61 and retrieves an optimum second task from a number of second tasks registered in the second task DB 61. Concretely, the second task extracting unit 63 retrieves a second task whose task required time is equal to or shorter than the task possible time and having a difference less than a predetermined error time (specifically, the difference based on the above-described critical value). Even when a second task is retrieved based on the task required time and the number of second tasks is narrowed, there is a case that the number to be suggested is too large. Consequently, the second task extracting unit 63 narrows down the number of second tasks to be suggested in consideration of an interruption risk, tastes of the driver, and the like.

The interruption risk is grasped by using the interruption risk grasping function. The second task extracting unit 63 calculates an interruption risk in consideration of at least one of the traffic information and the weather information. The interruption risk is a risk that the time zones (hereinafter, predicted time zones) TZ1 and TZ2 which are predicted of the task possible time cannot be set as initially predicted and the predicted time zones TZ1 and TZ2 are interrupted at the time of actual travel. For example, when it is snowing, an unexpected traffic accident tends to occur, so that the automation driving level is lowered from Level 3 to Level 2 or lower to prevent the traffic accident and, since the possibility that the second task cannot be executed increases, the interruption risk becomes higher. For example, in the chase where a large-scale event is held around the path and the traffic amount prediction precision decreases, there is the possibility that traffic jam is solved unexpectedly, travel time at speed less than permissible speed becomes short and, as a result, a second task cannot be executed.

The higher the interruption risk is, the more the second task extracting unit 63 has the tendency of preferentially extracting a second task which is less influenced by an interruption. A second task which is less influenced by an interruption can be grasped, for example, by using the interruption handling characteristic stored in the second task DB. A second task which is less influenced by an interruption corresponds to, for example, when a second task is watching of content, watching of content such as a variety program, a sports program recorded, and the like.

The second task extracting unit 63 of the embodiment processes such extraction for each of the predicted time zones TZ1 and TZ2. Therefore, in the case where the task possible time is divided into a plurality of time zones TZ1 and TZ2, the extracting process is executed for each of the divided time zones TZ1 and TZ2. Information of one or plural second tasks extracted for each of the time zones TZ1 and TZ2 is provided to the information presentation generating unit 64.

The information presentation generating unit 64 generates information presentation content which is presented to the information presentation device 31. The information presentation generating unit 64 controls display by the display 32 and controls sound made by the speaker 33. The information presentation generating unit 64 allocates the information presentation content to the elements of the display 32 and the speaker 33. Simultaneously, the information presentation generating unit 64 generates video data sequentially displayed in the display 32 and draws each of frame images constructing the video data. The information presentation generating unit 64 generates sound data to let the speaker 33 make sound in collaboration with the video data. The information presentation generating unit 64 has a route plan suggesting function and a second task suggesting function.

Figure 4:
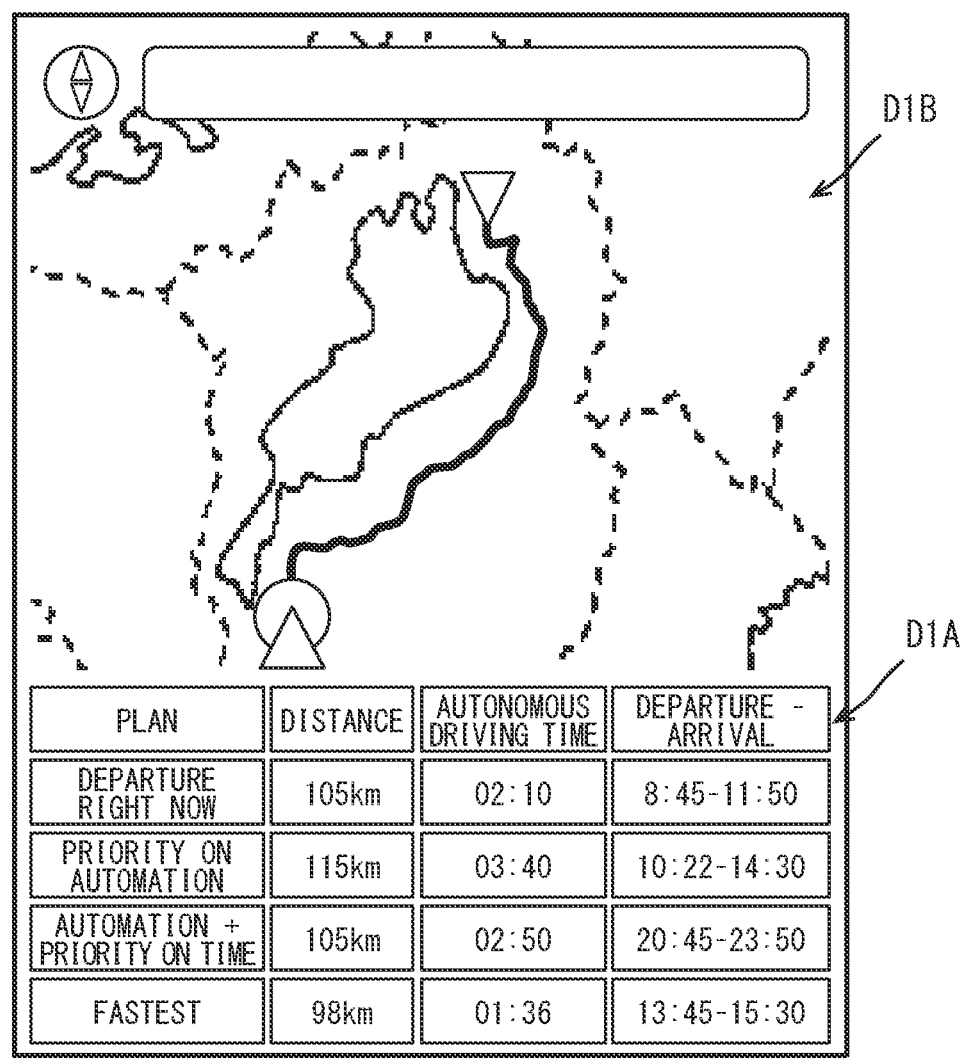
FIG. 4 is a diagram illustrating a route plan suggestion screen in the first embodiment.

The route plan suggesting function is a function of suggesting a plurality of route plans generated by the autonomous driving ECU 51 and grasped by the route grasping unit 62 to the driver so that one of the plurality of route plans is determined by selection of the driver. The information presentation generating unit 64 generates, as display items (also called display content) which are displayed in the display 32, as illustrated in FIG. 4, a plan suggestion display item D1A and a map display item D1B.

In the plan suggestion display item D1A, a plurality of route plans grasped by the route grasping unit 62 are displayed as a list. In the plan suggestion display item D1A, the title of each route plan, the distance (way) of paths in each route plan, predicted autonomous driving time, and departure time and predicted arrival time are displayed in a table. The map display item D1B is a display item accompanying the plan suggestion display item D1A and displays a path on a map corresponding to a route plan. The video data including the plan suggestion display item D1A and the map display item D1B generated is output as an electric signal to the display 32 and displayed in the allocated screen 32a.

Figure 5:
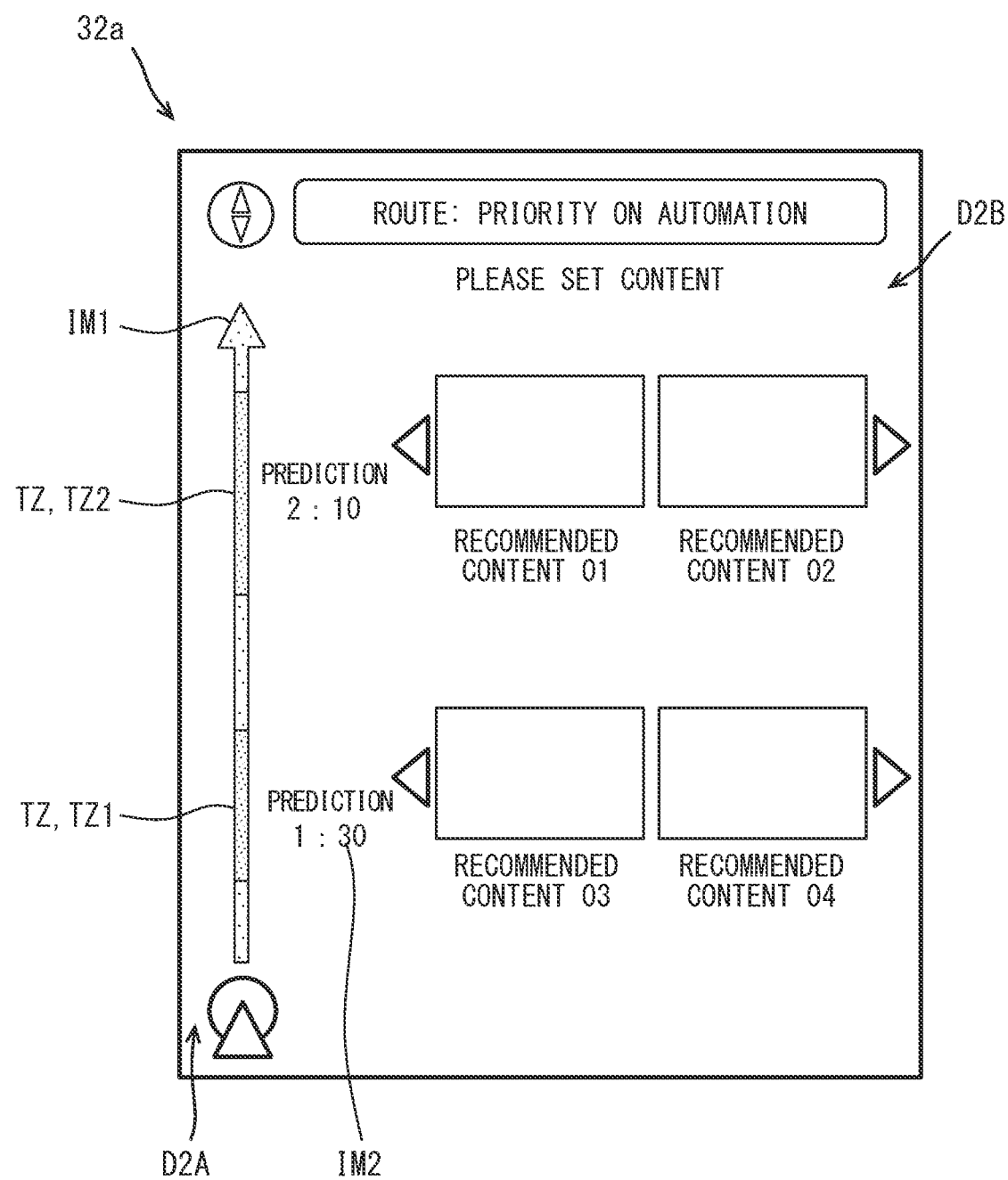
FIG. 5 is a diagram illustrating a second task suggestion screen in the first embodiment.

The second task suggesting function is a function of suggesting a second task extracted by the second task for the route plan determined by the selection of the driver. The information presentation generating unit 64 generates, as a display item to be displayed in the display 32, a task possible time display item D2A and a second task suggestion display item D2B as illustrated in FIG. 5.

In the task possible time display item D2A, task possible time during a route is displayed. The task possible time display item D2A includes a route arrow image IM1 and a task possible time display image IM2. The route arrow image IM1 is an image schematically depicting the route, in which one or plural predicted time zones TZ1 and TZ2 corresponding to the task possible time and a time zone which does not correspond to the task possible time are displayed so as to be distinguished from each other. The distinction is made by, for example, modes of different colors but another mode such as different thicknesses of lines or a plurality of modes may be combined. The task possible time display image IM2 displays the task possible time which is quantified as time from start to end of each of the predicted time zones TZ1 and TZ2 for each of the predicted time zones TZ1 and TZ2.

The second task presentation display item D2B is a display item accompanying the task possible time display item D2A and displays a second task to be suggested. The second task suggestion display item D2B displays a list of overviews of a plurality of second tasks to be suggested for each of the predicted time zones TZ1 and TZ2 which are depicted in the task possible time display item D2A. For example, the second task to be suggested is watching of content reproduced by the information presentation device 31, the overview of the content is formed by an illustration or video image symbolizing the content and text display of the title of the content. The video data including the task possible time display item D2A and the second task presentation display item D2B generated is output as an electric signal to the display 32 and displayed in the allocated screen 32a.

The suggestion process by the information presentation generating unit 64 is executed, typically, before departure of the route to the destination. The information presentation generating unit 64 displays the video data regarding the above-described suggested in the display 32 and waits, while maintaining the suggestion screen, until an input of the user operation of the driver to the suggestion is recognized.

The operation information acquiring unit 65 acquires information of the user operation (for example, operation of touching the second task suggestion display item D2B) of the driver for the above-described suggestion from the operation device 21 (for example, a touch panel). The information of the user operation acquired is provided to the content control unit 66 and the like.

The content control unit 66 controls reproduction of content to be watched in the second task. The content control unit 66 has a content setting function and a content reproducing function.

The content setting function is a function of accepting setting of content to the suggestion of the second task by the information presentation generating unit 64 and setting reproduction of the content. When the information of a user operation of setting content to be watched by the driver is grasped by the operation information acquiring unit 65, the content control unit 66 executes a process of setting the content. Concretely, as illustrated in FIG. 3, the content control unit 66 makes the setting so that the content is reproduced in the predicted time zones TZ1 and TZ2 corresponding to the set content.

The content reproducing function is a function of reproducing the content during the route to the destination by using the display 32 and the speaker 33 in accordance with the reproduction setting. The content control unit 66 sequentially determines whether a second task can be executed or not during the route to the destination and reproduces the set content in the time zone TZ in which a second task can be executed.

Specifically, when occurrence of the time zone TZ in which a second task corresponding to the predicted time zones TZ1 and TZ2 can be executed is determined, the content control unit 66 starts reproduction of the set content. Naturally, it can happen the start timing of the time zone TZ in which a second task can be executed varies slightly at the time of actual travel of the vehicle with respect to the start timing upon prediction of the predicted time zones TZ1 and TZ2. Consequently, when the start timing of the time zone TZ in which a second task can be executed is within a predetermined error time with respect to the start timing upon prediction, the content control unit 66 determines that the time zone TZ in which a second task can be executed is the predicted time zones TZ1 and TZ2.

As described above, the content control unit 66 obtains a change in the task possible time recalculated by the second task extracting unit 63 and the time zone TZ in which a second task can be executed during the route to the destination. For example, traffic jam may occur unexpectedly in a section before the section corresponding to the predicted time zones TZ1 and TZ2 during the route to the destination. There is consequently a case that a time zone (hereinbelow, unexpected time zone) TZ3 that is the time zone TZ in which a second task can be executed and is separated from the predicted time zones TZ1 and TZ2 additionally occurs before the predicted time zones TZ1 and TZ2. When the unexpected time zone TZ3 occurs before the predicted time zones TZ1 and TZ2 in the route to the destination, the content control unit 66 starts reproducing the content set for the predicted time zone TZ1 immediately after the unexpected time zone TZ3 by advancing the timing to the unexpected time zone TZ3.

As another example, there is a case that traffic jam occurs unexpectedly in a section after the sections corresponding to the predicted time zones TZ1 and TZ2 during the route to the destination. There is consequently a case that an unexpected time zone TZ4 that is a time zone in which a second task can be executed and is separated from the predicted time zones TZ1 and TZ2 occurs additionally before the predicted time zones TZ1 and TZ2. When the unexpected time zone TZ4 occurs after the predicted time zone TZ2 in the route to the destination, the second task extracting unit 63 extracts an additional second task which can be executed properly within the time of the unexpected time zone TZ4. At the time point when occurrence of the unexpected time zone TZ4 is predicted, the additional second task is also suggested to the driver and the driver's intention is confirmed through the user interface 20 in a manner similar to that before the departure.

Figure 6:
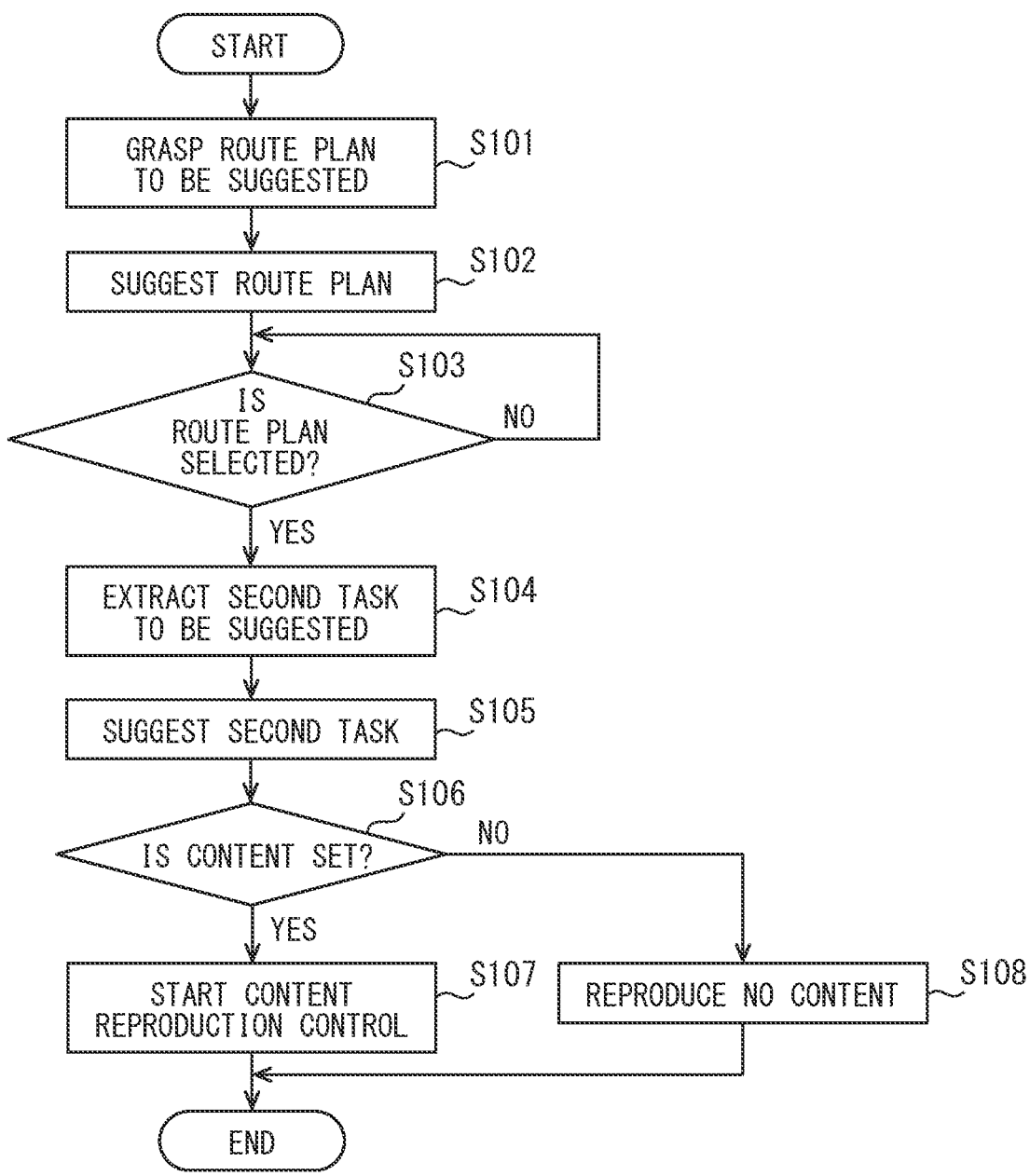
FIG. 6 is a flowchart illustrating processes by the HCU of the first embodiment.

Next, a method of assisting execution of a second task on the basis of a second task execution assistance program stored in the storing unit 13 and executed by the processing unit 11 will be described with reference to the flowcharts of FIGS. 6 and 7. Referring to FIG. 6, a method of suggesting a second task and confirming the intention of the driver before departure to a destination will be mainly described. Referring to FIG. 7, a method of handling a situation change during a route to a destination after departure will be mainly described.

A series of processes based on the steps of the flowchart of FIG. 6 is executed after an occupant such as a driver sets a destination by using the non-driving-operation device 23.

In S101, the route grasping unit 62 grasps a route to be suggested by obtaining information of a plurality of routes generated by the autonomous driving ECU 51. After the process of S101, the program moves to S102.

In S102, the information presentation generating unit 64 obtains information of a plurality of route plans from the route grasping unit 62 and generates video data to suggest a plurality of routes to the driver on the basis of the information of the plurality of route plans. The generated video data is displayed in the screen 32a of the display 32 (refer to also FIG. 4), and a state of waiting for a user operation of the driver is set. After the process of S102, the program moves to S103.

In S103, the operation information acquiring unit 65 determines whether an intention of selecting one route plan from the plurality of route plans is indicated by the user operation of the driver or not. When the positive determination is made in S103, the program moves to S104. When the negative determination is made in S103, the state of waiting for a user operation of the driver is continued and, after predetermined time, the determination of S103 is executed again.

In S104, the second task extracting unit 63 calculates task possible time in a selected route plan, and extracts a second task to be suggested on the basis of the task possible time. After the process of S104, the program moves to S105.

In S105, the information presentation generating unit 64 generates video data for suggesting a second task on the basis of information of the second task to be suggested obtained from the second task extracting unit 63. The generated video data is displayed in the screen 32a of the display 32 (also refer to FIG. 5) and the state of waiting for a user operation of the driver is obtained. After the process of S105, the program moves to S106.

In S106, when the second task suggested by the user operation of the driver is watching of content, the operation information acquiring unit 65 determines whether intention to set watching of specific content to be watched is indicated or not. When the positive determination is made in S106, the program moves to S107. When the negative determination is made in S106, the program moves to S108.

In S107, the content control unit 66 sets content and starts controlling reproduction of the set content. After S107, the series of processes is finished.

In S108, the content control unit 66 regards that the driver executes a second task other than watching of the content or does not execute a second task itself and determines that reproduction of the content is not executed. After S108, the series of processes is finished.

The series of processes based on the steps of the flowchart of FIG. 7 is executed when a change in the traffic situation or a change in the weather situation occurs during a route to a destination after departure.

In S111, the second task extracting unit 63 recalculates the task possible time and the time zone TZ including the task possible time in accordance with a change in the traffic situation or a change in the weather situation. After the process of S111, the program moves to S112.

In S112, the content control unit 66 determines whether or not the unexpected time zones TZ3 and TZ4 occur in recalculation of the second task extracting unit 63. When positive determination is made in S112, the program moves to S113.

In S113, the content control unit 66 determines whether or not the unexpected time zones TZ3 and TZ4 are earlier than the predicted time zone TZ1 or TZ2 which is predicted before the departure. When positive determination is made in S113, the program moves to S114. When negative determination is made in S113, the program moves to S115. When a plurality of unexpected time zones TZ3 and TZ4 occur like in FIG. 3, a process after handling each of the unexpected time zone TZ3 is executed and then a process after handling TZ4 can be executed.

In S114, the content control unit 66 starts reproducing content set for the predicted time zone TZ1 immediately after the unexpected time zone TZ3 so as to be advanced to the unexpected time zone TZ3. After S114, the series of processes is finished.

In S115, since the unexpected time zone TZ4 is later than the predicted time zones TZ1 and TZ2, the second task extracting unit 63 extracts an additional second task which can be executed properly within the time of the unexpected time zone TZ4, and the information presentation generating unit 64 suggests the additional content by using the information presentation device 31. After S115, the series of processes is finished.

In S116, since the unexpected time zones TZ3 and TZ4 do not occur, the content control unit 66 determines to reproduce the content which is set for the predicted time zones TZ1 and TZ2, in the predicted time zones TZ1 and TZ2. After S116, the series of processes is finished.

In the first embodiment, the HCU 100 corresponds to a "second task execution assistance device" assisting execution of a second task of a driver in an autonomous driving state in which the vehicle 1 becomes an execution entity of a driving task in cooperation with the user interface 20. The information presentation generating unit 64 corresponds to a "second task presenting unit" suggesting a second task through the user interface 20.

Effects

The effects of the first embodiment described above will be explained again hereinafter.

According to the first embodiment, a second task suggested to a driver through the user interface 20 is a second task which can be properly executed within predicted task possible time as time in which a second task can be executed. Since a second task appropriate to task possible time is suggested, even when it is difficult for a driver himself/herself to accurately understand and predict a condition under which a second task can be executed and task possible time corresponding to the condition, the driver can easily select a proper second task. By selecting and executing a second task optimized in time, the driver can effectively use time in a route to a destination.

According to the first embodiment, in the case where the task possible time is divided into a plurality of short time zones TZ1 and TZ2, a different second task is suggested to each of the short time zones. It suppresses that the driver executes one second task in the plurality of time zones TZ1 and TZ2. Therefore, the driver can execute a second task at an appropriate timing, and troublesomeness and frustration given to the driver can be reduced.

According to the first embodiment, a second task of task required time having a difference less than a predetermined error time with respect to task possible time is retrieved, and at least a part of the retrieved second task is extracted as a second task to be suggested. In retrieval, the second task DB 61 in which various second tasks and their task required times are associated is used. Since the required time of a second task can be easily obtained by accessing to the DB 61, the resources of a computer can be effectively used and a more appropriate second task can be suggested.

According to the first embodiment, the higher an interruption risk that the autonomous driving state is interrupted is, the more a second task which is less influenced by an interruption is extracted. When the driver executes a second task which is less influenced by interruption in response to the suggestion, even if the autonomous driving state is interrupted unexpectedly, troublesomeness and frustration given to the driver can be reduced.

According to the first embodiment, reproduction of content to be watched in a second task of watching content is controlled according to the task possible time. When reproduction of content is controlled according to task possible time, an operation of the driver such as setting of reproduction start time of suggested content in accordance with a time zone of task possible time can be eliminated. Therefore, the driver can easily execute a second task.

According to the first embodiment, when the driver sets suggested content, the set content is reproduced in a time zone in which execution of a second task becomes actually possible. Since set content is reproduced in accordance with actual time, even if actual time becomes different from time at the time of prediction, occurrence of a situation that content is reproduced in a manual driving state or a state where the driver has to monitor the surrounding can be suppressed.

According to the first embodiment, in the case where, after content is set, the unexpected time zone TZ3 as another time zone in which a second task can be executed occurs unexpectedly before the predicted time zones TZ1 and TZ2 as time zones predicted at the time of setting, reproduction of the set content is started in the unexpected time zone TZ3 earlier than scheduled. Since content the driver desires to watch can be provided early, satisfaction at the time of execution of a second task of the driver can be increased.

According to the first embodiment, task possible time is predicted in consideration of at least one of traffic information of a road on which the vehicle 1 travels and weather information. By making a dynamic factor which changes task possible time such as traffic information and weather information included in prediction, precision of predicting task possible time increases. Further, the possibility that required time of a second task suggested is within task possible time and the possibility that occurrence of margin in task possible time can be decreased. With the above, the driver can effectively use time in a route to a destination.

Second Embodiment

Figure 9:
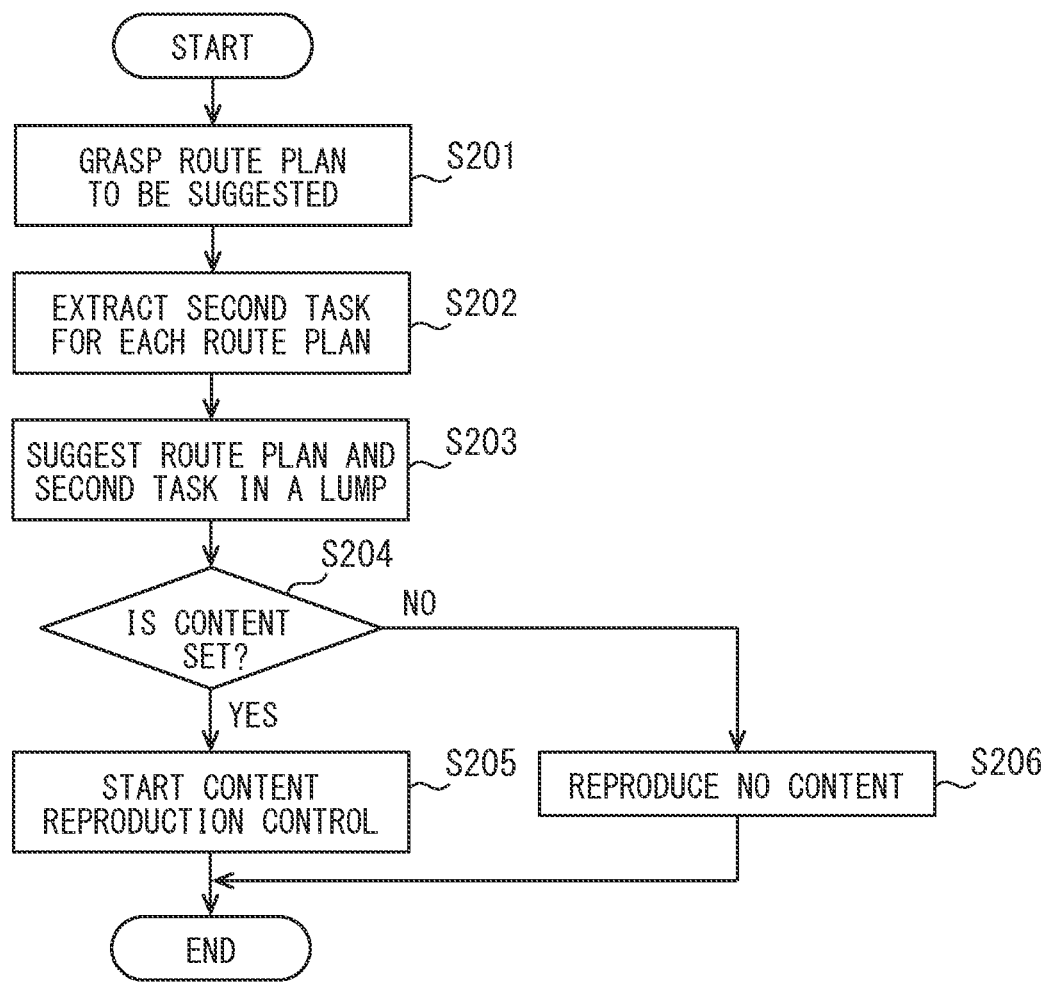
FIG. 9 is a flowchart illustrating processes by an HCU of the second embodiment.

As illustrated in FIGS. 8 and 9, a second embodiment is a modification of the first embodiment. The second embodiment will be described mainly with respect to the point different from the first embodiment.

The second task extracting unit 63 of the second embodiment obtains information of a plurality of route plans which are generated by the autonomous driving ECU 51 and are before narrowed down to one through the route grasping unit 62 and extracts a second task which can be properly executed for each of the route plans. Specifically, the second task extracting unit 63 calculates task possible time for each route plan and extracts a second task which can be executed properly within task possible time individually corresponding to each of the route plan.

The information presentation generating unit 64 of the second embodiment has a lump suggestion function. The lump suggestion function is a function of suggesting a route plan and a second task in a lump to make the driver select one optimum route plan from a plurality of route plans in consideration of a second task which can be executed properly. The information presentation generating unit 64 generates a lump suggestion display item D3 as a display item displayed in the display 32.

In the lump suggestion display item D3, a plurality of route plans are displayed in a list. In the lump presentation display item D3, a title of each route plan, predicted driving time for each route plan, predicted manual driving time for each route plan, predicted time when the level becomes Level 2 in the automatic driving time corresponding to the route plan, task possible time corresponding to each of the route plans, and a second task which can be executed properly within the task possible time corresponding to the route plan are displayed in a table. In FIG. 8, the predicted driving time is displayed as "required time", the predicted manual driving time is displayed as "manual time", the prediction time of Level 2 is displayed as "Level-2 time", and the task possible time is displayed as "Level-3 time". Video data including the generated lump suggestion display item D3 is output as an electric signal to the display 32 and displayed in the allocated screen 32*a*.

In the second embodiment, also in the case where the task possible time is divided into a plurality of short time zones, the second task extracting unit 63 extracts a second task which can be properly executed within total task possible time of the time zones. The information presentation generating unit 64 also suggests total task possible time and a second task appropriate to the time.

Next, a method of assisting execution of a second task on the basis of a second task execution assistance program stored in the storing unit 13 and executed by the processing unit 11 will be described with reference to the flowchart of FIG. 9. Referring to FIG. 9, a method of suggesting a second task and confirming intention of the driver before departure to a destination will be mainly described.

S201 is similar to S101 of the first embodiment. After the process of S201, the program moves to S202.

In S202, the second task extracting unit 63 calculates task possible time in a plurality of route plans and extracts a second task to be suggested for each route plan on the basis of the task possible time. After the process of S202, the program moves to S203.

In S203, the information presentation generating unit 64 generates video data suggesting a plurality of route plans and second tasks corresponding to the route plans in a lump on the basis of information of the plurality of route plans obtained from the route grasping unit 62 and information of the second tasks to be suggested obtained from the second task extracting unit 63. After the process of S203, the program moves to S204.

S204 to S206 are similar to S106 to S108 of the first embodiment. After S205 or S206, the series of processes is finished.

According to the second embodiment described above, a plurality of routes to a destination, task possible time in each of the routes, and a second task which can be properly executed within the task possible time in each route are suggested in a lump. By such a lump suggestion, the driver can select one route from the plurality of routes in accordance with a second task the driver desires to execute. Therefore, a route selecting method which is novel and has not been available of selecting a route placing priority of a second task can be provided.

Third Embodiment

Figure 10:
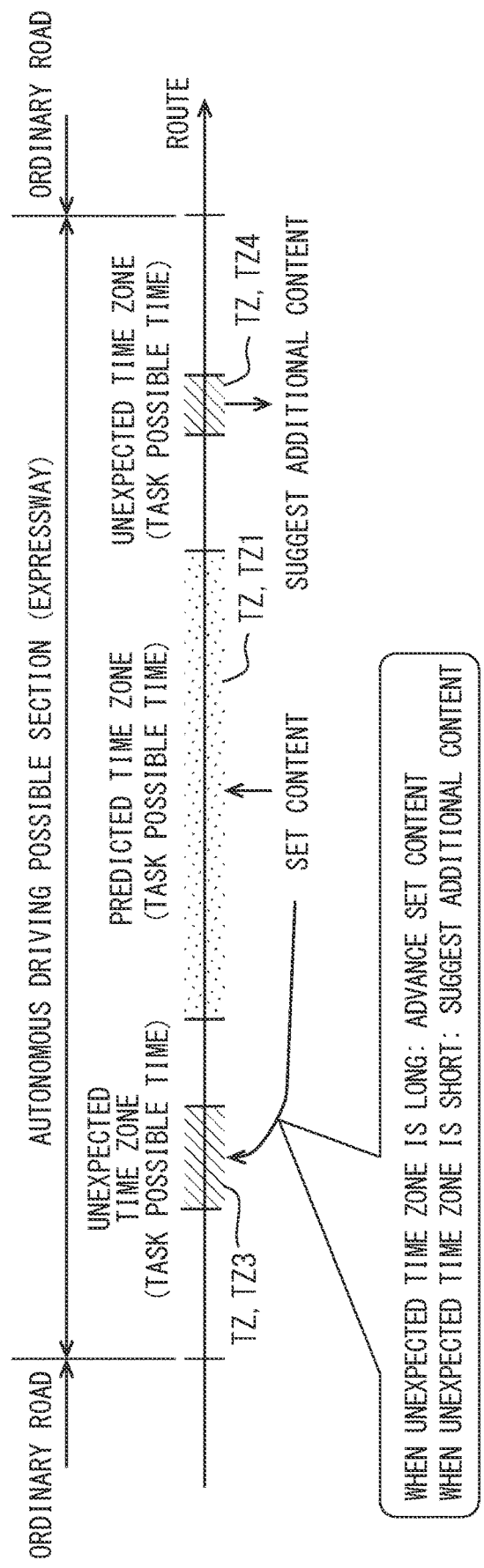
FIG. 10 is a diagram schematically illustrating task possible time and content in a route to a destination in a third embodiment.
Figure 11:
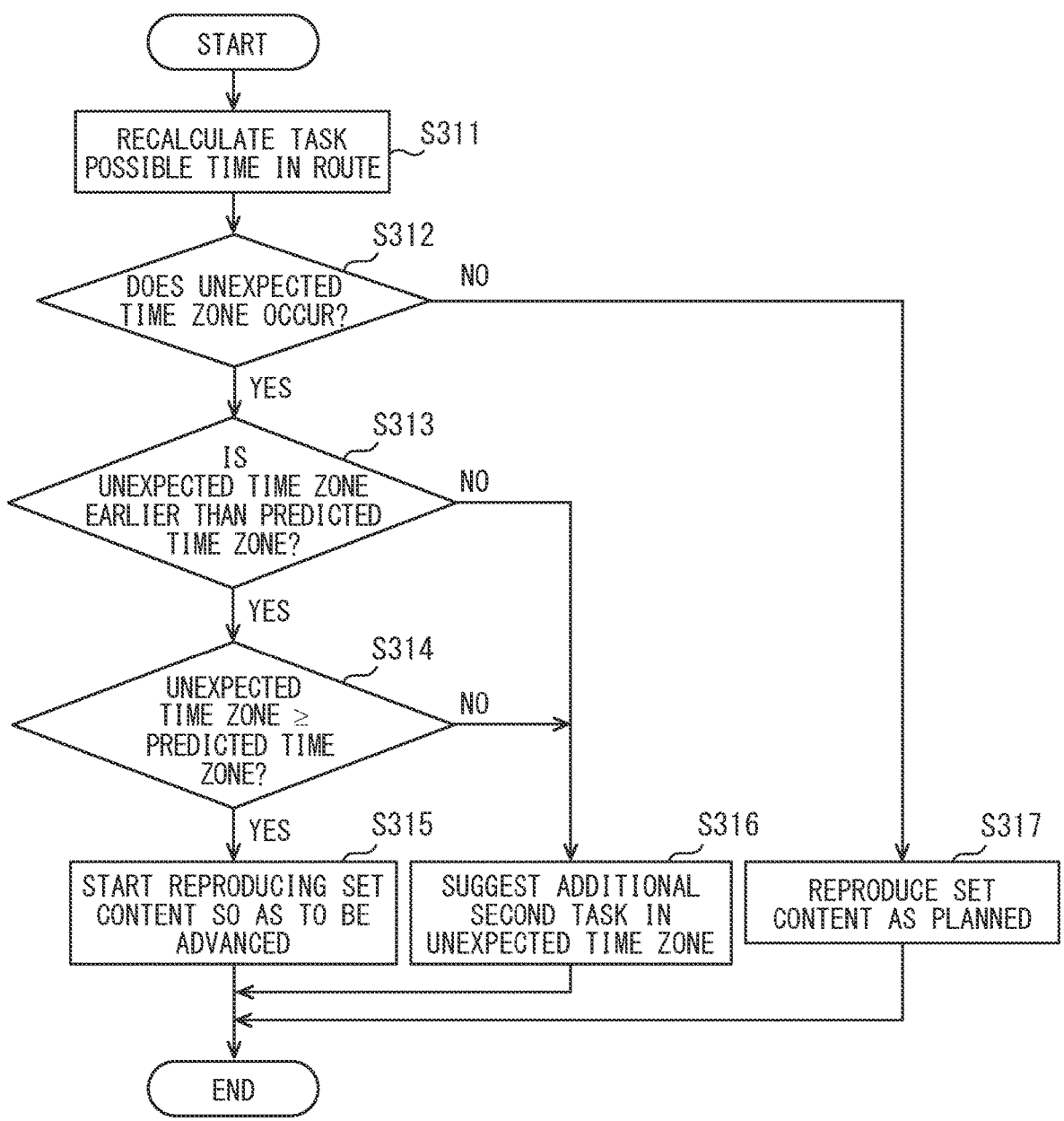
FIG. 11 is a flowchart illustrating processes by an HCU of the third embodiment.

As illustrated in FIGS. 10 and 11, a third embodiment is a modification of the first embodiment. The third embodiment will be described mainly with respect to the point different from the first embodiment.

In a manner similar to the first embodiment, the content control unit 66 of the third embodiment obtains task possible time recalculated by the second task extracting unit 63 and a change of the time zone TZ in which a second task can be executed during a route to a destination. As illustrated in FIG. 10, when the unexpected time zone TZ3 occurs before the predicted time zone TZ1, the content control unit 66 determines whether or not content set for the predicted time zone TZ1 is reproduced so as to be advanced to the unexpected time zone TZ3 in accordance with the length of the unexpected time zone TZ3.

Specifically, the content control unit 66 determines whether or not the length of the unexpected time zone TZ3 is long time which is equal to or longer than the predicted time zone TZ1. In the case where the length of the unexpected time zone TZ3 is long time equal to or longer than the predicted time zone TZ1, the content control unit 66 starts reproducing the content set for the predicted time zone TZ1 so as to be advanced to the unexpected time zone TZ3.

In the case where the length of the unexpected time zone TZ3 is short time less than the predicted time zone TZ1, the content control unit 66 reproduces the content set for the predicted time zone TZ1 as planned in the predicted time zone TZ1. For the unexpected time zone TZ3, the second task extracting unit 63 extracts an additional second task which can be properly executed within the time of the unexpected time zone TZ3. Also with respect to the additional second task, at the time point occurrence of the unexpected time zone TZ3 is predicted, suggestion and intention confirmation to the driver is performed through the user interface 20 in a manner similar to that before departure.

Next, a method of assisting execution of a second task on the basis of a second task execution assistance program stored in the storing unit 13 and executed by the processing unit 11 will be described by using the flowchart of FIG. 11. Referring to FIG. 11, a method of dealing with a situation change during a route to a destination after departure will be mainly described.

S311 to S313 are similar to S111 to S113 of the first embodiment. When negative determination is made in S312, the program moves to S317. When positive determination is made in S313, the program moves to S314. When negative determination is made in S313, the program moves to S314.

In S314, the content control unit 66 determines whether the length of the unexpected time zones TZ3 and TZ4 is long time equal to or longer than the predicted time zone. When positive determination is made in S314, the program moves to S315. When negative determination is made in S316, the program moves to S316.

In S315, the content control unit 66 starts reproducing content set for the predicted time zone TZ1 so as to be advanced to the unexpected time zone TZ3. After S315, the series of processes is finished.

In S316, the unexpected time zones TZ3 and TZ4 are after the predicted time zone TZ1 or the unexpected time zone TZ3 is short time. Consequently, the second task extracting unit 63 extracts an additional second task which can be properly executing with the time of the unexpected time zones TZ3 and TZ4 and the information presentation generating unit 64 suggests the additional content by using the information presentation device 31. After S316, the series of processes is finished.

In S317, since the unexpected time zone TZ3 does not occur, the content control unit 66 determines to reproduce content set for the predicted time zone TZ1, in the predicted time zone TZ1. After S317, the series of processes is finished.

According to the third embodiment described above, in the case where the unexpected time zone TZ3 in which a second task becomes executable unexpectedly occurs after content is set and before the predicted time zone TZ1 which is predicted at the time of setting, whether reproduction of the set content is started so as to be advanced to the unexpected time zone TZ3 is determined. Since whether reproduction of one piece of content is divided into a plurality of time zones in the case of advancing the reproduction can be determined on the basis of the length of the unexpected time zone TZ3, flexible reproduction control according to whether content can be divided or not can be performed.

According to the third embodiment, in the case where the unexpected time zone TZ3 occurs before the predicted time zone TZ1 and the unexpected time zone TZ3 is long time equal to or longer than the predicted time zone TZ1, reproduction of the set content is started so as to be advanced to the unexpected time zone TZ3. Since content the driver wishes to watch can be provided early while suppressing division of reproduction of the content to a plurality of time zones, satisfaction level of the driver at the time of execution of a second task can be made higher.

According to the third embodiment, in the case where the unexpected time zone TZ3 occurs before the predicted time zone TZ1 and the unexpected time zone TZ3 is short time less than the predicted time zone TZ1, a second task which can be properly executed within time of the unexpected time zone TZ3 different from the set content is suggested. By selecting and executing the suggested second task, the driver can effectively use also a time zone which occurs unexpectedly.

Other Embodiments

Although a plurality of embodiments have been described above, the present disclosure is not interpreted by being limited to the embodiments but can be applied to various embodiments and combinations without departing from the gist of the present disclosure.

Concretely, as a first modification of the first embodiment, the second task extracting unit 63 may extract a second task which can be properly executed for each of route plans before one route plan is determined like in the second embodiment. The information presentation generating unit 64 may display the suggestion screen of FIG. 4 and, when a user operation of selecting one route plan by the driver is recognized, suggest a second task extracted in advance in accordance with the selected route plan by the suggestion screen of FIG. 5.

As a second modification of the second embodiment, in the lump suggestion display item D3, as long as the title of each route plan, task possible time appropriate to each route plan, and a second task which can be properly executed within the task possible time appropriate to each route plan are displayed, other time and the like may not be displayed.

As a third modification of the third embodiment, the content control unit 66 may determine whether or not length of the unexpected time zone TZ3 is long time equal to or longer than task required time of a second task to be determined to be advanced or not in place of determining whether or not length of the unexpected time zone TZ3 is long time equal to or longer than the predicted time zone TZ1.

As a fourth modification, in the range where the gist of suggestion is maintained, display layouts and the like of the suggestion screens of FIGS. 3, 5, and 8 can be properly changed. For example, in the suggestion screens of FIGS. 3 and 8, in place of displaying a plurality of route plans in a table, the route plans can be displayed so as to be arranged like icons.

As a fifth modification, the autonomous driving ECU 51 may have a specification that when the vehicle 1 travels in an autonomous driving section, the autonomous driving state managing unit 52 sets the autonomous driving level to Level 3 regardless of the speed of the vehicle 1 as long as an unexpected factor such as reach to the function limit of the autonomous driving function does not occur.

As a sixth modification, even when the autonomous driving level is Level 3, if an additional condition is not satisfied, the driver cannot execute a second task, that is, the task possible time is not added. The additional condition is, for example, a situation that the possibility of changing to the driving to the driver is lower than a predetermined value.

As a seventh modification, task possible time is calculated in the autonomous driving ECU 51, and the second task extracting unit 63 of the HCU 100 may extract a second task to be suggested by using the task possible time obtained from the autonomous driving ECU 51.

As an eighth modification, each of the functions provided by the HCU 100 and the autonomous driving ECU 51 can be provided by software and hardware executing it, only software, only hardware, or composite combination of them. Further, in the case where such a function is provided by an electronic circuit as hardware, each function can be provided by a digital circuit including a number of logic circuits or an analog circuit.

As a ninth modification, the form of a storing medium storing a program or the like capable of realizing the above-described information presentation control may be also properly changed. For example, a storage medium is not limited to a configuration provided on a circuit board but may be provided in the form of a memory card or the like which is inserted in a slot and electrically connected to the control circuit of the HCU 100 or the autonomous driving ECU 51. Further, the storage medium may be an optical disk, a hard disk, or the like from which a program is copied to the HCU 100 or the autonomous driving ECU 51.

As a tenth modification, at least a part of the functions (for example, a function of planning a schematic route) in the route planning unit 53 of the autonomous driving ECU 51 may be realized by the HCU 100. The autonomous driving ECU 51 and the HCU 100 may be integrated in one electronic control unit and the electronic control unit may correspond to the "second task execution assistance device".

As an eleventh modification, the HCU 100 may not have the content control unit 66. An audio device communicably connected to the HCU 100, different from the HCU 100, may be provided, and the audio device may realize the function of the content control unit 66.

As a twelfth modification, the second task execution assistance device may not be mounted in the vehicle 1. For example, when the second task execution assistance device is the HCU 100, in the case where the HCU 100 is not mounted in the vehicle 1 but is disposed fixedly on the outside of the vehicle or is mounted in another vehicle, the information presentation device 31 may be remote-controlled by communication of the internet, road-to-vehicle communication, vehicle-to-vehicle communication, or the like.

The second task execution assistance device may be a control device of a portable terminal such as a smartphone. As the portable terminal, the control device and a user interface such as a display may be integrally formed. At least one of suggestion of a route plan and suggestion of a second task by the portable terminal does not have to be executed in the vehicle 1 but may be made by the driver before riding on the vehicle 1, for example, at home or a place where the driver dropped in such as a service area of an expressway.

As a thirteenth modification, the vehicle 1 can perform the autonomous driving of Level 4 in the automation driving levels defined by the society of automotive engineers of the United States. In this case, since autonomous driving possible sections and other sections can exist, it is effective to set predicted autonomous driving time predicted to be required to travel the autonomous driving section as task possible time and suggest a second task which can be properly executed in the task possible time.

As a fourteenth modification, the vehicle 1 is not limited to a general private car but may be a rental car, a vehicle for a manned taxi, a ride-share vehicle, a freight vehicle, a bus or the like.

As a fifteenth modification, by coupling the driving operation device 22 directly to the vehicle control actuator 44, in the case such that the automation driving level is Level 0, the driver may directly operate the vehicle control actuator 44 without using the autonomous driving ECU 51.

As a sixteenth modification, the vehicle 1 may be optimized according to the road traffic law of each country and area. Further, task possible time grasped by the second task execution assistance device and a second task extracted and suggested by the second task execution assistance device may be optimized according to the road traffic law of each country and area.

The control unit and its method described in the present disclosure may be realized by a dedicated computer constructing a processor programmed so as to execute one or plural functions embodied by a computer program. Alternately, the device and its method described in the present disclosure may be realized by a dedicated hardware logic circuit. Alternately, the device and its method described in the present disclosure may be realized by one or more dedicated computers configured by combination of a processor executing a computer program and one or more hardware logic circuits. The computer program may be stored as an instruction executed by a computer in a computer-readable non-transition tangible recording medium.

Although the present disclosure is described in accordance with the embodiments, it is to be understood that the present disclosure is not limited to the embodiments and structures. The present disclosure includes various modifications and also modifications in range of equivalency. In addition, although various combinations and modes are described in the present disclosure, other combinations and modes including only one element or more or less are within the range of the present disclosure and the idea range.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A second task execution assistance device assisting execution of a second task of a driver in cooperation with a user interface in an autonomous driving state in which a vehicle is an execution entity of a driving task, the second task execution assistance device comprising:

a second task extracting unit grasping task possible time estimated as time in which the second task is executable in a route to a destination of the vehicle, and extracting the second task having a task required time shorter than the task possible time and equal to or longer than a predetermined ratio of the task possible time from a second task database;

a second task suggesting unit suggesting the second task extracted by the second task extracting unit through the user interface; and a content control unit controlling reproduction of a content as a watching target in the second task for watching the content in accordance with the task possible time, wherein:

the content control unit grasps a user operation for reserving the content suggested by the second task suggesting unit;

the content control unit reproduces a reserved content in a time zone the second task becomes actually executable; and when an unexpected time zone occurs as another time zone, in which the second task becomes executable unexpectedly, earlier than a predicted time zone as a time zone predicted at a time of a reservation after reserving the content, the content control unit starts reproducing the reserved content so as to be advanced to the unexpected time zone.

2. The second task execution assistance device according to claim 1, wherein:

the second task suggesting unit suggests the second task for each of a plurality of short time zones when the task possible time is divided into the plurality of short time zones.

3. The second task execution assistance device according to claim 1, wherein:

the second task extracting unit accesses the second task database in which various second tasks are respectively connected to task required times as required times for the second tasks, retrieves a part of the various second tasks having the task required times with a difference less than a predetermined error time from the task possible time, and extracts at least a part of retrieved second tasks.

4. The second task execution assistance device according to claim 1, wherein:

the second task extracting unit calculates an interruption risk that the autonomous driving state is interrupted, using at least one of traffic information of a road on which the vehicle travels and weather information.

5. The second task execution assistance device according to claim 1, wherein:

the second task extracting unit grasps a plurality of routes to the destination and extracts the second task which is executable properly for each of the routes; and the second task suggesting unit suggests each of the routes, the task possible time in each of the routes, and the second task which is executable properly within the task possible time in each of the routes, thereby suggesting the second task and requesting the driver to select one of the routes.

6. The second task execution assistance device according to claim 1, wherein:

the second task extracting unit predicts the task possible time in consideration of at least one of traffic information of a road on which the vehicle travels and weather information.

7. The second task execution assistance device according to claim 1 further comprising:

one or more processors; and a memory coupled to the one or more processors and storing program instructions that when executed by the one or more processors cause the one or more processors to provide at least: the second task extracting unit and the second task suggesting unit.

8. A second task execution assistance device assisting execution of a second task of a driver in cooperation with a user interface in an autonomous driving state in which a vehicle is an execution entity of a driving task, the second task execution assistance device comprising:
a second task extracting unit grasping task possible time estimated as time in which the second task is executable in a route to a destination of the vehicle, and extracting the second task having a task required time shorter than the task possible time and equal to or longer than a predetermined ratio of the task possible time from a second task database;
a second task suggesting unit suggesting the second task extracted by the second task extracting unit through the user interface; and
a content control unit controlling reproduction of a content as a watching target in the second task for watching the content in accordance with the task possible time, wherein:
the content control unit grasps a user operation for reserving the content suggested by the second task suggesting unit;
the content control unit reproduces a reserved content in a time zone the second task becomes actually executable; and
when an unexpected time zone occurs as another time zone, in which the second task becomes executable unexpectedly, earlier than a predicted time zone as a time zone predicted at a time of a reservation after reserving the content, the content control unit determines in accordance with a length of the unexpected time zone whether reproduction of the reserved content is started so as to be advanced to the unexpected time zone.

9. The second task execution assistance device according to claim 8, wherein:
when the unexpected time zone occurs earlier than the predicted time zone and the length of the unexpected time zone is equal to or longer than the predicted time zone, the content control unit starts reproducing the reserved content so as to be advanced to the unexpected time zone.

10. The second task execution assistance device according to claim 8, wherein:
when the unexpected time zone occurs earlier than the predicted time zone and the length of the unexpected time zone is shorter than the predicted time zone, the content control unit suggests the second task which is executable properly within the unexpected time zone and different from the reserved content.

11. A non-transitory tangible computer readable storage medium comprising instructions being executed by a computer, the instructions including a computer-implemented method for assisting an execution of a second task of a driver in cooperation with a user interface in an autonomous driving state in which a vehicle is an execution entity of a driving task, the instructions causing at least one processor to execute:
grasping task possible time estimated as time in which the second task is executable in a route to a destination of the vehicle;
extracting the second task having a task required time shorter than the task possible time and equal to or longer than a predetermined ratio of the task possible time from a second task database;
suggesting an extracted second task via the user interface; and
controlling reproduction of a content as a watching target in the second task for watching the content in accordance with the task possible time, wherein:
the at least one processor grasps a user operation for reserving the content suggested by the second task suggesting unit;
the at least one processor reproduces a reserved content in a time zone the second task becomes actually executable; and
when an unexpected time zone occurs as another time zone, in which the second task becomes executable unexpectedly, earlier than a predicted time zone as a time zone predicted at a time of a reservation after reserving the content, the at least one processor starts reproducing the reserved content so as to be advanced to the unexpected time zone.

12. A non-transitory tangible computer readable storage medium comprising instructions being executed by a computer, the instructions including a computer-implemented method for assisting an execution of a second task of a driver in cooperation with a user interface in an autonomous driving state in which a vehicle is an execution entity of a driving task, the instructions causing at least one processor to execute:
grasping task possible time estimated as time in which the second task is executable in a route to a destination of the vehicle;
extracting the second task having a task required time shorter than the task possible time and equal to or longer than a predetermined ratio of the task possible time from a second task database;
suggesting an extracted second task via the user interface; and
controlling reproduction of a content as a watching target in the second task for watching the content in accordance with the task possible time, wherein:
the at least one processor grasps a user operation for reserving the content suggested by the second task suggesting unit;
the at least one processor reproduces a reserved content in a time zone the second task becomes actually executable; and
when an unexpected time zone occurs as another time zone, in which the second task becomes executable unexpectedly, earlier than a predicted time zone as a time zone predicted at a time of a reservation after reserving the content, the at least one processor determines in accordance with a length of the unexpected time zone whether reproduction of the reserved content is started so as to be advanced to the unexpected time zone.

* * * * *